(12) United States Patent
Langendijk et al.

(10) Patent No.: US 12,380,300 B2
(45) Date of Patent: Aug. 5, 2025

(54) UNIDIRECTIONAL TRANSFER OF DATA FROM SENDER TO RECEIVER

(71) Applicant: LiveDrop B.V., Eindhoven (NL)

(72) Inventors: Erno Hermanus Antonius Langendijk, Eindhoven (NL); Jurjen Caarls, Eindhoven (NL); Maarten Bastiaan Tobias, Eindhoven (NL); Patrick Nicolaus Franciscus Moreu, Eindhoven (NL)

(73) Assignee: LIVEDROP B.V., Eindhoven (NL)

( * ) Notice: Subject to any disclaimer, the term of this patent is extended or adjusted under 35 U.S.C. 154(b) by 2 days.

(21) Appl. No.: 18/342,234

(22) Filed: Jun. 27, 2023

(65) Prior Publication Data

US 2023/0419063 A1    Dec. 28, 2023

(30) Foreign Application Priority Data

Jun. 28, 2022    (EP) .................................... 22181484

(51) Int. Cl.
*G06K 7/08*     (2006.01)
*G06K 7/14*     (2006.01)
*G06K 19/06*    (2006.01)

(52) U.S. Cl.
CPC ..... *G06K 7/1417* (2013.01); *G06K 19/06037* (2013.01)

(58) Field of Classification Search
CPC .... G06K 19/06037; G06K 19/06; G06K 7/14; G06K 7/1417; G06K 7/1413; G06K 5/02; G06K 19/06028; G06K 7/1443
USPC ................................................. 235/451, 383
See application file for complete search history.

(56) References Cited

U.S. PATENT DOCUMENTS

| | | | | |
|---|---|---|---|---|
| 7,810,115 | B1* | 10/2010 | Harvey | H04N 21/4622 725/38 |
| 9,270,420 | B2 | 2/2016 | Khan et al. | |
| 9,600,701 | B1 | 3/2017 | Chien et al. | |
| 9,948,813 | B2* | 4/2018 | Kim | G06K 7/10722 |
| 10,440,098 | B1 | 10/2019 | Bryer et al. | |
| 2005/0210179 | A1* | 9/2005 | Walmsley | G06F 21/445 711/3 |
| 2006/0067592 | A1* | 3/2006 | Walmsley | G06K 15/102 382/303 |
| 2006/0294312 | A1* | 12/2006 | Walmsley | H04L 9/3215 711/122 |

(Continued)

FOREIGN PATENT DOCUMENTS

WO    2019032655 A1    2/2019

*Primary Examiner* — Daniel St. Cyr
(74) *Attorney, Agent, or Firm* — Nixon & Vanderhye, P.C.

(57) ABSTRACT

A method, system and devices are provided for unidirectional transfer of data from a sender device (100) to a receiver device (200). At the sender device, respective parts of the data are encoded to generate respective 2D barcodes, and the 2D barcodes are sequentially displayed on a display (142). At the receiver device, an image sensor (222) is used to capture the sequentially displayed 2D barcodes to obtain a series of captured images, and in each or a subset of the series of captured images, detect a position of a respective 2D barcode in the captured image, scan the 2D barcode at the identified position to obtain barcode data, and decode the barcode data to, together with the barcode data obtained from other captured images, obtain a received version of the transmitted data.

14 Claims, 6 Drawing Sheets

(56) References Cited

U.S. PATENT DOCUMENTS

| | | |
|---|---|---|
| 2010/0020970 A1 | 1/2010 | Liu et al. |
| 2013/0181051 A1* | 7/2013 | Olmstead ............. G06K 7/1096 |
| | | 235/440 |
| 2014/0084067 A1 | 3/2014 | Vanderhulst |
| 2015/0261970 A1 | 9/2015 | Mevec et al. |
| 2016/0292476 A1 | 10/2016 | Kim |
| 2017/0264364 A1* | 9/2017 | Aoyama ............ H04B 10/1141 |
| 2017/0310743 A1* | 10/2017 | Aoyama ............... G06F 16/958 |
| 2019/0065803 A1 | 2/2019 | Burke et al. |

* cited by examiner

UNIDIRECTIONAL TRANSFER OF DATA FROM SENDER TO RECEIVER

This application claims priority to EP patent application Ser. No. 22/181,484.1 filed Jun. 28, 2022, the entire contents of which are hereby incorporated by reference.

FIELD OF THE INVENTION

The invention relates to a system and computer-implemented method for unidirectional transfer of data from a sender device to a receiver device. The invention further relates to the sender device, to the receiver device and to a computer-implemented method performed at the sender device and/or at the receiver device. The invention further relates to a computer-readable medium comprising data representing instructions arranged to cause a processor system to perform a respective computer-implemented method.

BACKGROUND OF THE INVENTION

There are numerous ways to transfer data from a sender device to a receiver device, for example via Wi-Fi, Bluetooth, Ethernet, etc. However, often the data connections established via such wired and wireless networks are bidirectional, which brings the inherent risk that a computer virus or other type of malware is received back from the receiver device, or that vulnerabilities at the sender device are exploited by the receiver device.

One way to approach this problem is to use one-directional data communication. For example, a so-called "data diode" is a unidirectional network communication device to transmit data in only one direction. Disadvantageously, a data diode needs custom-built hardware and is therefore expensive. It further only uses temporal modulation to transmit data, which may limit the maximum achievable transmission rate from sender device to receiver device. Another means to transmit data unidirectionally is via a 2D barcode, such as a QR code. Such 2D barcodes may encode data, which data may be transmitted from a sender device to a receiver device by the sender device displaying the 2D barcode and the receiver device scanning the displayed 2D barcode to access the data.

The problem with using 2D barcodes is that the amount of data which can be encoded in a 2D barcode is limited. For example, in a QR code, each block may assume one of only two colors ("dark" and "bright", which in most cases is black & white). As such, a QR code may only code 1 bit per block ("0" or "1"). In another example of a 2D barcode, namely a JAB code, the blocks may assume additional colors, namely red, green, blue, yellow, magenta, cyan. Hence, a block in a JAB code may encode 3 bits (2 3=8). Nevertheless, to transmit larger amounts of data, a 2D barcode may need to be very high-resolution, which may be problematic when displaying the 2D barcode but also when capturing it with an image sensor, for example due to sensitivity to noise.

It is known to use sequentially display a number of 2D barcodes to transmit larger amounts of data. While such video based QR codes increase the amount of data which may be transferred, it also introduces other problems, such as how to reliably detect the 2D barcodes or how to detect the 2D barcodes in a computationally efficient manner.

It is therefore an object of the invention to provide a unidirectional data transfer which addresses one or more of the above-mentioned problems.

SUMMARY OF THE INVENTION

In accordance with a first aspect of the invention, a computer-implemented method is provided for unidirectional transfer of data from a sender device to a receiver device, wherein the sender device comprises or is connected to a display and the receiver device comprises or is connected to an image sensor. The method comprises:
at the sender device:
  accessing data to be transmitted to the receiver device;
  encoding respective parts of the data to generate respective 2D barcodes;
  sequentially displaying the 2D barcodes on the display;
at the receiver device:
  using the image sensor, capturing the sequentially displayed 2D barcodes to obtain a series of captured images, and in each or a subset of the series of captured images:
    detecting a position of a respective 2D barcode in the captured image;
    scanning the 2D barcode at the identified position to obtain barcode data;
    decoding the barcode data to, together with the barcode data obtained from other captured images, obtain a received version of the transmitted data.

In accordance with a further aspect of the invention, a transitory or non-transitory computer-readable medium is provided, wherein the computer-readable medium comprises data representing instructions arranged to cause a processor system to perform select steps of a computer-implemented method as described in this specification, wherein the select steps are steps to be performed at the sender device or at the receiver device or at both the sender device and the receiver device.

In accordance with a further aspect of the invention, a sender device is provided. The sender device is configured for unidirectional transfer of data to a receiver device and comprises:
  a data storage interface to a data storage;
  a display output to a display;
  a processor subsystem configured to:
    via the data storage interface, access the data to be transmitted to the receiver device;
    encode respective parts of the data to generate respective 2D barcodes;
    via the display output, sequentially display the 2D barcodes on the display.

In accordance with a further aspect of the invention, a receiver device is provided. The receiver device is configured for receiving data from a sender device, wherein the sender device is configured to transmit the data by sequentially displaying 2D barcodes on a display. The receiver device comprises:
  a sensor interface to an image sensor;
  a processor subsystem configured to:
    using the image sensor, capture the sequentially displayed 2D barcodes to obtain a series of captured images, and in each or a subset of the series of captured images:
      detect a position of a respective 2D barcode in the captured image;
      scan the 2D barcode at the identified position to obtain barcode data;
      decode the barcode data to, together with the barcode data obtained from other captured images, obtain a received version of the transmitted data.

The above measures involve transferring data unidirectionally from a sender device to a receiver device. The sender device may comprise a display or may be connected to a display. For example, the sender device may be a computer such as a laptop or desktop PC or a mobile device such as a smartphone or tablet. The receiver device may comprise an image sensor or may be connected to an image sensor. Such an image sensor may typically be part of a camera module which, in addition to the image sensor, may also comprise one or more optical components including one or more lenses. The receiver device may for example be a mobile device such as a smartphone, tablet, or a pair of smart glasses.

The sender device may comprise or have access to data which is to be transferred to the receiver device. Such data may take various forms, including but not limited to text data, image data, audio data, etc. At the side of the sender device, the transfer may involve generating a displayable version of the data, namely in the form of a series of 2D barcodes. For that purpose, respective parts of the data may be encoded to generate respective 2D barcodes. Normally, each 2D barcode may encode a different part of the data, but in some cases, there may be overlap in the data between different 2D barcodes, for example for redundancy reasons. The 2D barcode, which may also be referred to as a matrix code or matrix barcode or simply as a 2D code, may be any known type of 2D barcode, including but not limited to a QR code, a JAB code, a Data Matrix, etc. Encoding schemes for such 2D barcodes are known per se. The 2D barcodes may be displayed by the sender device on the display in a sequential manner, e.g., in a video-like manner. For example, every second or every ½, ⅓, ¼, ⅕, 1/10, 1/20, 1/30 or 1/60 of a second, a different 2D barcode may be displayed. This way, the entirety of the data to be transferred may be displayed by the sender device in form of a series of 2D barcodes on the display.

The receiver device may capture the series of 2D barcodes displayed on the display with its image sensor. For example, in case the receiver device is a mobile device with a built-in camera, the camera may be pointed at the sender device's display to capture the contents of the display. Such capture may result in a sequence of captured images, which may in some embodiments may be captured by recording a video of the sender device's display. In each or at least a subset of the captured images, the receiver device may detect a position of a respective 2D barcode and then scan the 2D barcode at the identified position to obtain barcode data. Detecting the position of the 2D barcode may for example involve detecting one or more spatial markers in or in a vicinity of the 2D barcode. Scanning the 2D barcode may involve determining the value of the data elements of the 2D barcode (e.g., whether a data element assumes the value of "0" or "1" in a QR code), for example using image analysis. Once the barcode data is obtained, the barcode data may be decoded to, together with the barcode data obtained from other captured images, obtain a received version of the transmitted data. In some embodiments, the barcode data may contain redundancy, for example by the data to be transmitted being encoded using error correcting code, to be able to correct for errors in the transmission. In other embodiments, the barcode may contain the data to be transmitted without additional redundancy measures.

In accordance with the above measures, the data is transmitted from the sender device to the receiver device as a sequence of 2D barcodes and thereby in form of a video-version of a 2D barcode. This increases the amount of data which can be transferred in comparison to using only a 2D barcode as a still image. Advantageously, the spatial resolution of the 2D barcodes does not need to be as high as the spatial resolution needed when using only a still image. In some embodiments, the transmission rate may be further increased by making use of different intensities of the primary colors of the display.

The above measures may be advantageously applied in situations where a certain amount of data transfer is needed, and other methods of data transfer are not available (e.g., no Wi-Fi) or not an option due to security concerns (e.g., military, or medical field) or other available data transfer means cannot transfer enough data (typically for conventional static QR codes). The above measures for example be used in the medical field to transmit patient data such as an X-ray image from doctor to patient without the risk of infecting the doctor's computer with a computer virus from the smartphone of a patient.

Optionally, at the sender device, a respective 2D barcode is generated using a mask pattern, and at the receiver device, respective barcode data is decoded based on the mask pattern, wherein the mask pattern is a spatiotemporal mask pattern which is different for consecutive pairs of the sequentially displayed 2D barcodes. Spatial mask patterns are known per se for use in static 2D barcodes and may be used to change the value of data elements in known ways to make a 2D barcode code more readable for a barcode scanner. For example, in QR codes, one of 8 mask patterns may be selected for data masking. Such mask patterns may elsewhere also simply be referred to as 'masks'. Disadvantageously, if the data to be transmitted is similar between consecutive 2D barcodes, the 2D barcodes themselves may also be similar, despite the use of a mask pattern. Such similarity between 2D barcodes may hinder their correct detection at the receiver device. For example, the receiver device may fail to recognize the change between 2D barcodes as they may be identical or hard to distinguish from one to another and therefore recognize two or more consecutive 2D barcodes as a single 2D barcode. In accordance with the above measures, a mask pattern is used which not only introduces a spatial variance in the data elements of a 2D barcode, but also temporally. In other words, the mask pattern may be different for consecutive 2D barcodes. Such a spatiotemporal mask pattern not only facilitates the detection of an individual 2D barcode in a captured image, e.g., in terms of its spatial position, but also of the change from one 2D barcode to another 2D barcode, even when the data contained in the 2D barcodes is identical or similar.

Optionally, the spatiotemporal mask pattern is a video or is obtained from a video, wherein the video is accessible to the sender device and the receiver device. By obtaining the mask pattern in form of a video or deriving the mask pattern from the video, the mask pattern may be unique yet easily understood by a user, which may facilitate the configuration of the sender device and the receiver device with the same mask pattern. In addition, videos may be well available. For example, a company video may be used as mask pattern, which company video may already be available at the sender device and may be easily retrieved from the Internet at the receiver device. Although not necessarily needed, the video preferably has a high degree of spatial variation and temporal variation.

Optionally, the spatiotemporal mask pattern is generated algorithmically as a pseudo-random pattern using a seed, wherein the seed is accessible to the sender device and the receiver device. A seed may thus be used to generate a known pseudo-random sequence. The sender device and the receiver device may both use the same seed and the same algorithm to generate the spatiotemporal mask pattern, thereby ensuring that the spatiotemporal mask pattern is identical at both ends. Advantageously, there is no need to store large files as the spatiotemporal mask pattern may be generated on the fly.

Optionally, generating the respective 2D barcode using the spatiotemporal mask pattern comprises spatially combining the spatiotemporal mask pattern and the data to be transmitted to obtain the barcode data for the 2D barcode, for example using an exclusive or (XOR) or a weighted average.

Optionally, at the sender device, spatial markers are displayed in spatial relation to the barcode data of respective 2D barcodes to facilitate detection of the 2D barcodes in the series of captured images, wherein an appearance of at least one of the spatial markers varies between the sequentially displayed 2D barcodes. It is known to use spatial markers in 2D barcodes to facilitate the spatial detection of a 2D barcode in a captured image. Disadvantageously, the spatial markers themselves cannot always be robustly detected, for example when similar spatial patterns occur in the barcode's background or within the barcode. As a result, detection of the spatial marker may not always be possible, or its detection may be computationally complex and thereby slow. In accordance with the above measures, such spatial markers differ between consecutive barcodes. In other words, the spatial markers may have a spatial pattern that varies over time. It may be known to the receiver device how the spatial pattern varies over time. This may then be used to detect the barcodes more robustly. Namely, the variation over time may be used as additional guidance to distinguish actual spatial markers from erroneous detections. Advantageously, using the above measures, the robustness of the detection of the spatial markers, and thereby of the detection of the 2D barcode itself, is improved.

Optionally, the at least one spatial marker is generated to maximize a difference between the appearance of the spatial marker in consecutive pairs of sequentially displayed 2D barcodes, for example by being inverted in intensity and/or color between consecutive pairs of 2D barcodes. The spatial markers may thus alter in appearance between consecutive barcodes, for example by greatly differing in hue, saturation, and/or brightness. Such types of spatial markers may be easily detected by determining a difference between captured images, for example by simply subtracting two consecutive images from each other to obtain a difference image. As camera motion may be limited in this time interval, the spatial markers may, due to their alternating appearance, 'pop-out' from the difference image in the form of a local but large difference. This further improves the detection of the spatial markers, and thereby the detection of the 2D barcode itself.

Optionally, the at least one spatial marker varies in appearance between the sequentially displayed 2D barcodes at a temporal frequency which is different from the temporal frequency at which the barcode data in the respective 2D barcodes is refreshed. For example, in some embodiments, the spatiotemporal markers vary at a temporal frequency that is higher than the temporal frequency at which the 2D barcode is refreshed, for example 1.1×, 1.2×, 1.5×, 2×, 5×, 10×, etc. higher. In other embodiments, the spatiotemporal markers vary at a temporal frequency that is lower than the temporal frequency of the 2D barcode, for example 1.1×, 1.2×, 1.5×, 2×, 5×, 10×, etc. lower.

Optionally the at least one spatial marker varies in appearance between the sequentially displayed 2D barcodes according to a predetermined temporal pattern. For example, the intensity of the spatial marker may vary over time as a sinusoid from one intensity state to the other intensity state and back, or as a saw tooth form. The predetermined temporal pattern may be known to the receiver device and may be used additional guidance to distinguish actual spatial markers from erroneous detections.

Optionally, the at least one spatial marker comprises a line segment delineating at least part of the 2D barcode, wherein the line segment preferably has a primary color or a secondary color. By delineating at least part of the 2D barcode with a line segment in a primary or secondary color, the outline of the 2D barcode may be easily identified. Namely, primary colors (e.g., red, green, blue) and secondary colors (e.g., cyan, magenta, yellow) are easily distinguished from each other as they in most color spaces represented by datapoints which are relatively far removed from each other. This may be advantageous, in that for example a thresholding may be applied to a captured image in a particular color space to detect pixels of one color. Through these detected pixels, a line segment may then be fitted so as to determine at least part of the outline of the 2D barcode. It is noted that in some embodiments, the line segments may not need to have a primary color or a secondary color but instead any color which is relatively far removed from the colors selected for the barcode data from the 2D barcode. This may allow each of the line segments to be easily distinguished from the barcode data of the 2D barcode.

Optionally, the 2D barcode is delineated by a plurality of line segments, wherein at least two of the plurality of line segments have a different color. For example, the 2D barcode may have a rectangular shape and may be delineated by line segments in color A at the top, color B at the bottom, color C at the left side, and color D at the right side, with the crossing between top/bottom and left/right side lines determining the corners of the 2D barcode. The colors themselves may determine which side is top, bottom, left, or right.

Optionally, at the sender device, the 2D barcodes are sequentially displayed to cause the barcode data in the 2D barcodes to be refreshed at a first temporal frequency, and at the receiver device, images are captured at a second temporal frequency, wherein the second temporal frequency is higher than the first temporal frequency. By using a capture rate (e.g., as defined in frames/sec) which is higher than the refresh frequency of the 2D barcodes, it may be avoided that 2D barcodes are missed by the receiver device. Preferably, the second temporal frequency is at least twice as high as the first temporal frequency as this may ensure that the receiver device obtains at least one clear capture of a respective barcode. Namely, if the second temporal frequency were the same or only slightly higher than the first temporal frequency, a phase shift between the display time and the capture time may cause the captured images to contain a mixture of two 2D barcodes, which may hinder or even prevent the correct detection and decoding of the 2D barcodes.

Optionally, at the receiver device, it is identified which captured images contain unique 2D barcodes by determining differences between consecutive pairs of captured images. If the second temporal frequency is at least twice as high as the first temporal frequency, the receiver device may obtain at least two capture images of a respective 2D barcode. Typically, one of the images may be a 'good' image showing the 2D barcode while the other one may be a 'mix' image showing the 2D barcode blended with the previous or following 2D barcode. To determine which images contain unique barcodes and which images contain the same barcode, the receiver device may determine differences between consecutive pairs of captured images, and if the difference is below a threshold, a consecutive pair of captured images may be identified to show a same 2D barcode.

Optionally, at the receiver device, if two or more consecutive captured images are identified to show a same 2D barcode, one of the two or more captured images is selected for extraction of the barcode data, for example a middle image in case of three or more captured images. This way, the clearest capture of a respective barcode may be obtained, as the middle image is most likely to show the barcode in a clear manner.

Optionally, the barcode data is provided with a header which comprises information to assist the receiver device in determining the temporal order of 2D barcodes and/or to assist in error correction. For example, the header may comprise a counter which is incremented for 2D barcode so as to enable the receiver device to identify unique 2D barcodes and/or to reassemble the data of the 2D barcodes in the correct order.

Optionally, at the sender device, a video is displayed within a spatial subregion of the 2D barcodes. When encoding the 2D barcodes, a spatial subregion of the sequence of 2D barcodes may not be used for data transfer but rather to show a video. This video may for example show instructions how to perform the data transfer or the like. In an embodiment, two subregions are used to show two different videos. In another embodiment, the spatial subregion is not fixed but rather moves within the outline of the 2D barcode.

It will be appreciated by those skilled in the art that two or more of the above-mentioned embodiments, implementations, and/or optional aspects of the invention may be combined in any way deemed useful.

Modifications and variations of any system, device, computer-implemented method or any computer-readable medium, which correspond to the described modifications and variations of another one of said entities, can be carried out by a person skilled in the art on the basis of the present description.

BRIEF DESCRIPTION OF THE DRAWINGS

These and other aspects of the invention will be apparent from and elucidated further with reference to the embodiments described by way of example in the following description and with reference to the accompanying drawings, in which.

It should be noted that the figures are purely diagrammatic and not drawn to scale. In the figures, elements which correspond to elements already described may have the same reference numerals.

LIST OF REFERENCE NUMBERS AND ABBREVIATIONS

Figure 1:
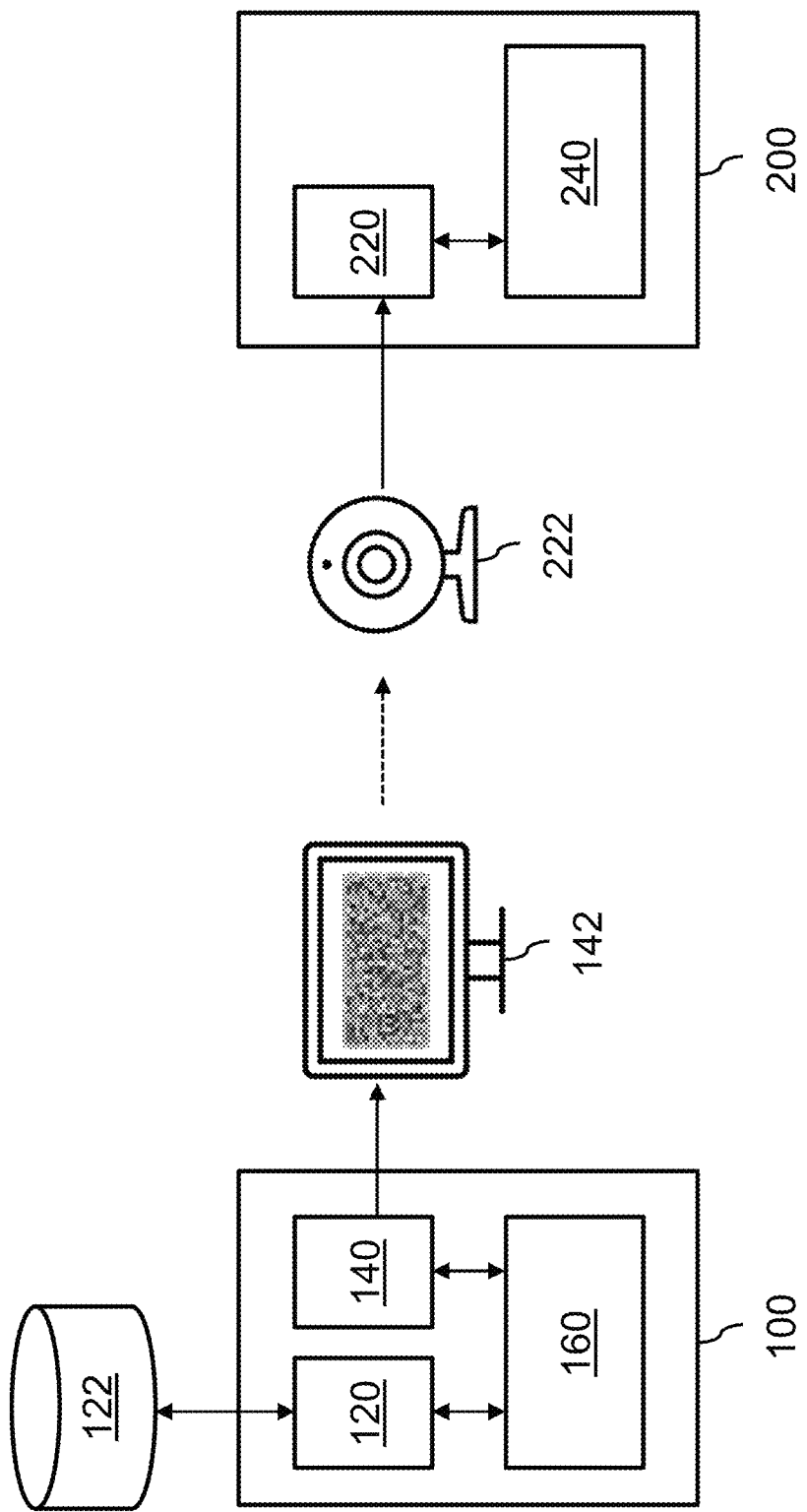
FIG. 1 shows a sender device configured for unidirectional transfer of data to a receiver device, wherein the unidirectional transfer comprises the sender device encoding data to be transmitted as respective 2D barcodes and sequentially displaying the 2D barcodes on a display, and the receiver device capturing images of the 2D barcodes and decoding the 2D barcodes so as to obtain a received version of the transmitted data.

The following list of reference numbers is provided for facilitating the interpretation of the drawings and shall not be construed as limiting the claims.
100 sender device
120 data storage interface
122 data storage
140 display output
142 display
160 processor subsystem
200 receiver device
220 sensor interface
222 image sensor
240 processor subsystem
300 sender device side
310 data to be transmitted
320 mask
330 masked data to be displayed as 2D barcode
340 transmission by display and capture
350 receiver device side
360 captured image of masked data
370 received version of transmitted data
400 data to be transmitted
410 mask in form of video frame
420 masked data to be displayed as 2D barcode
500 2D barcode
510 line segment in first primary or secondary color
520 line segment in second primary or secondary color
600 captured image data in frame n
610 captured image data in frame n+1
620 difference
700 non-transitory computer-readable medium
710 stored data

DETAILED DESCRIPTION OF EMBODIMENTS

FIG. 1 illustrates the unidirectional transfer of data from a sender device 100 to a receiver device 200. The sender device 100, which is configured for said unidirectional transfer of data to the receiver device 200, may comprise a data storage interface 120 to a data storage 122, a display output 140 to a display 142 and a processor subsystem 160 which may be configured to, during operation of the sender device 100, via the data storage interface 120, access the data to be transmitted to the receiver device, encode respective parts of the data to generate respective 2D barcodes, and via the display output 140, sequentially display the 2D barcodes on the display 142. The receiver device 200, which may be configured to receive data from the sender device 100, may comprise a sensor interface 220 to an image sensor 222 and a processor subsystem 240 which may be configured to, using the image sensor 222, capture the 2D barcodes which are sequentially displayed on the display 142 to obtain a series of captured images, and in each or a subset of the series of captured images, detect a position of a respective 2D barcode in the captured image, scan the 2D barcode at the identified position to obtain barcode data, and decode the barcode data to, together with the barcode data obtained from other captured images, obtain a received version of the transmitted data.

Briefly speaking, an exemplary operation of the sender device and the receiver device may be the following. Here and elsewhere, the sequence of 2D barcodes may also be referred to as a 'video barcode'. On the sender device, a user may select a file containing data to be transmitted, or such data may be selected automatically. The sender device may then generate a video barcode and display the video barcode on its display. The receiver device may comprise a camera which is able to capture the video barcode. From the captured video data, the data which was transmitted by the sender device may be decoded. The thus-obtained data is elsewhere also referred to as a 'received version' of the data and may be a bit true copy of the data at the sender device but may also be an approximation thereof, e.g., if errors occurred during transmission. It is noted that the occurrence of such errors may be acceptable in some applications, e.g., image or video transfer, while in others, the occurrence of errors may be avoided or reduced by encoding the data using an error correction scheme. It is further noted that in cases where a file is selected at the sender device, either the entire file may be transmitted (e.g., with headers, metadata, etc.) or only the contents of the file, in which case the receiver device may in some embodiments reconstruct the file locally or generate another file to store the contents.

With continued reference to FIG. 1., it is noted that the data storage 122 may take various forms, such as a memory, a solid-state drive or an array of solid-state drives, a hard drive, or an array of hard drives, etc. The data storage interface 120 may be a type of interface which corresponds to the type of data storage, e.g., a memory interface, a solid-state drive interface, etc. By way of example, FIG. 1 shows the data storage 122 to be an external data storage, but the data storage 122 may also be an internal component of the sender device 100. Similarly, by way of example, FIG. 1 shows the display 142 to be an external display, but the display 142 may also be an internal component of the sender device 100. The display interface 140 may likewise take any suitable form, such as an internal display interface, e.g., based on MPI DSI or MDDI, or an external display interface, e.g., based on HDMI or USB-C, etc. With reference to the receiver device 200, it is noted that the image sensor 222 may be part of a camera, which may be an external camera (e.g., a webcam) or an internal camera of the receiver device 200. The sensor interface 220 may take any suitable form to receive captured image data from the image sensor 222. With reference to the processor subsystems 160, 240 of the sender device and receiver device, each of these may be embodied by a single CPU, such as a x86 or ARM-based CPU, but also by a combination of such CPUs and/or other types of processing units, such as GPUs.

Although not shown in FIG. 1, the sender device 100 and the receiver device 200 may each also comprise additional components. For example, the receiver device 200 may, like the sender device 100, also comprise a data storage interface to a data storage and/or a display interface to a display, while both the sender device 100 and the receiver device 200 may comprise a user input interface to a user input device, such as a touch screen, a keyboard, a mouse, etc., to enable a user to interact with a respective device.

In some embodiments, the functions described with reference to the processor subsystem of either the sender device 100 or the receiver device 200 may be implemented by software, for example as an application such as a mobile app. For example, the sender device 100 may be a computer or mobile device which is configured to execute a sender app, which app allows selecting a file for transfer and which then displays a video barcode, while the receiver device 200 may be a computer or mobile device which is configured to execute a receiver app, which app allows capturing the video barcode with the device's camera and which then provides access to the transmitted data. In some embodiments, both the sender device 100 and the receiver device 200 may be a same type of device, e.g., a computer, mobile phone, tablet device, smart watch, etc. In other embodiments, the sender device 100 may be a different type of device than the receiver device 200. For example, the sender device 100 may be a mobile device with integrated display, while the receiver device 100 may be smart glasses with integrated camera.

Figure 2:
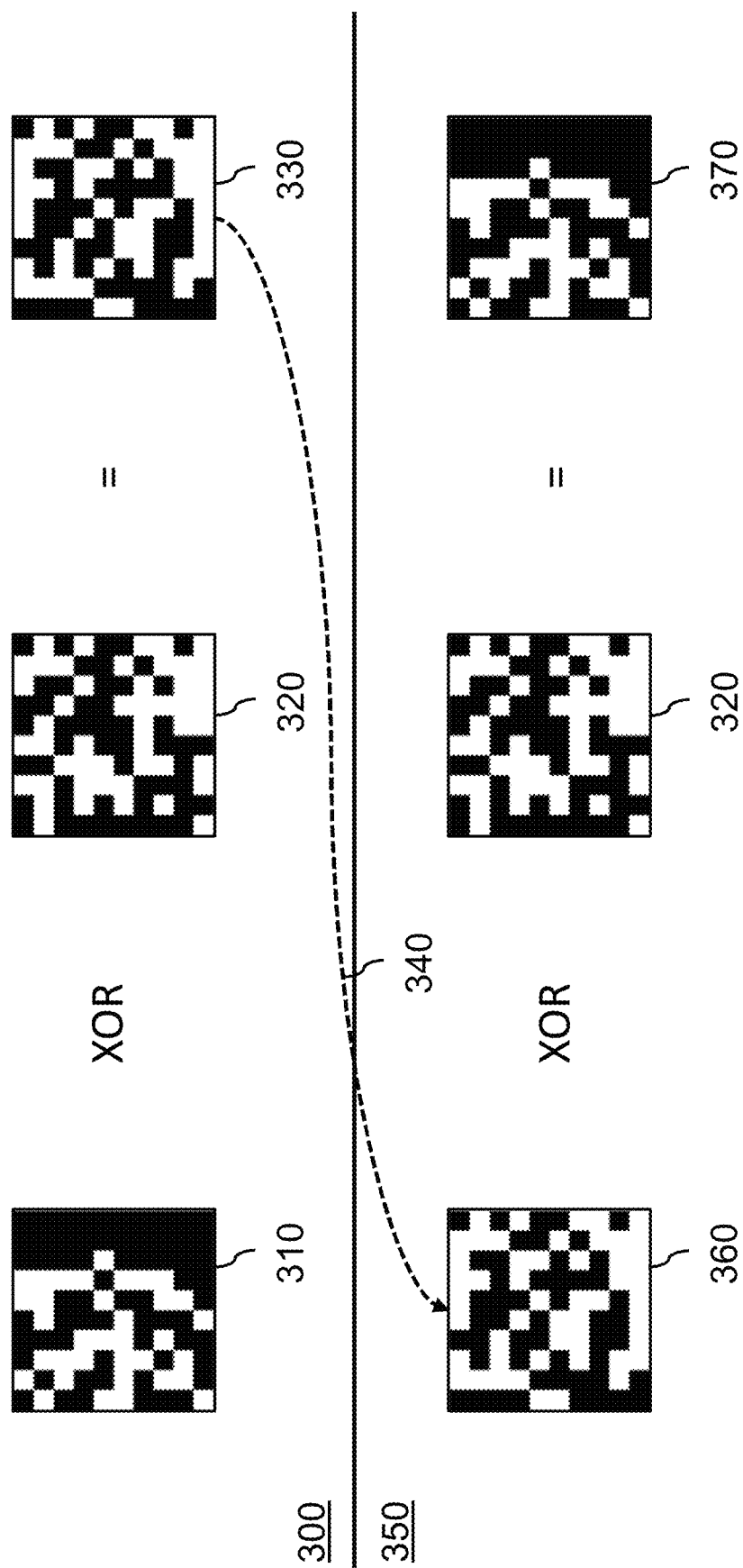
FIG. 2 shows data which is to be transmitted being encoded at the sender device, and decoded at the receiver device, using a spatiotemporal mask pattern.

FIG. 2 further illustrates the unidirectional transfer of data from the sender device to the receiver device. More specifically, FIG. 2 shows steps being performed either at a sender device side 300 or at a receiver device side 350. At the sender device side 300, data 310 to be transmitted may be accessed. In FIG. 2 and elsewhere, for sake of illustration, this data 310 is already shown to be encoded in a manner which is suitable to be displayed as (part of) a 2D barcode. In some embodiments, this data 310 may then be masked by a mask pattern 320 to obtain masked data 330 for display. Such masking may be performed in various ways, for example by, as in the example of FIG. 2, XORing the data 310 with the mask pattern 320, or by adding the mask pattern 320 to the data 310, etc. The masked data 330 may then be displayed at the sender device side, e.g., as part of a video barcode, and captured at the received device side 350, e.g., using a camera. This process of display and capture is in FIG. 2 also illustrated by an arrow 340 representing the transmission of the data from sender to receiver. With continued reference to the receiver device side 350, a captured image of the masked data 330 may be obtained in form of captured image data 360. The captured image data may then be decoded using the (same) mask pattern 320, which may for example involve again XORing with the mask pattern 320. As a result, at the receiver device side 350, a received version 370 of the transmitted data may be obtained.

Figure 3:
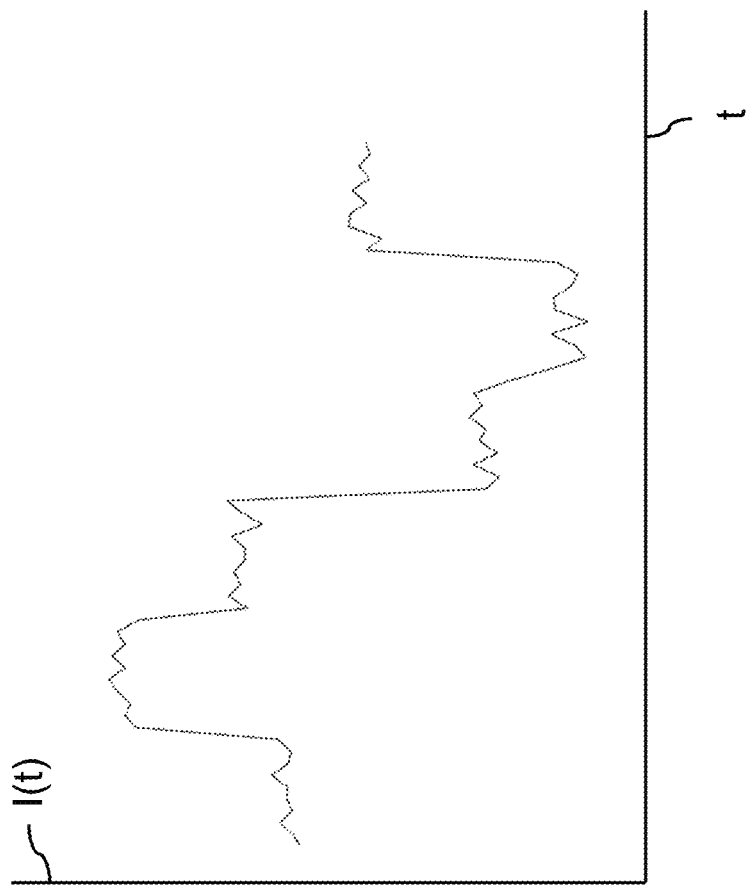
FIG. 3 shows intensity as function of time of a part of a 2D barcode in the captured image data of the receiver device, wherein the intensity profile shows that respective 2D barcodes are well distinguishable even if they contain similar data.

In some embodiments, the mask pattern may be a spatiotemporal mask pattern which is different for consecutive pairs of the sequentially displayed 2D barcodes. As such, the process illustrated in FIG. 2 may be repeated for different data parts using a different mask pattern for each of the different data parts. This may be advantageous, as may be illustrated with reference to FIG. 3 in which intensity is shown along the vertical axis as function of time along the horizontal axis. More specifically, FIG. 3 shows an intensity profile I(t) for a particular spatial position within the captured video. It can be clearly seen that the intensity profile comprises different plateaus. Each plateau may correspond to a different 2D barcode. Such individual 2D barcodes may conventionally not be easily distinguishable if the data between 2D barcodes does not change. By specifically using a spatiotemporal mask, temporal changes may be introduced between consecutive 2D barcodes even if the data contained in the consecutive 2D barcodes in the same or similar.

At the sender side, such masking by a spatiotemporal mask may be mathematically represented as follows:

$$I(i,j,k)=(P(i,j,k)+D(i,j,k))/2,$$

where i and j indicate the horizontal and vertical position of pixels in the image (I), respectively, k is the frame number, P is a known mask pattern, and D is the data to be transferred. In this respect, it is noted that the masking is shown to be an addition but may alternatively be an XOR or any other type of reversible masking operation.

At the receiver side, the transmitted data can be extracted from the captured image data by subtracting the known pattern from the captured image data:

$$D(i,j,k)=2*I(i,j,k)-P(i,j,k)$$

When P(i,j,k) is different from P(i,j,k+1), the image I(i,j,k) is different from I(i,j,k+1) even when D(i,j,k)=D(i,j,k+1). Only when P (i,j,k)+D (i,j,k)=P (i,j,k+1)+D (i,j,k+1), two subsequent 2D barcodes are identical, but this is very unlikely to occur when P varies spatially and temporally (e.g., has a high enough entropy).

In other embodiments, a weighted average may be used to combine known pattern (P) and data (D):

$$I(i,j,k)=(a*P(i,j,k)+b*D(i,j,k))/(a+b),$$

The use of a weighted average may be advantageous to create more headroom for the data (by selecting b>a) or to be more robust in detecting a next 2D barcode (a>b), which detection is also in general further discussed in the following.

The receiver device may preferably be able to capture all individual 2D barcodes which are displayed by the sender device. For that purpose, the receiver device may capture video at a higher framerate than is used by the sender device to display unique 2D barcodes. In other words, the recording framerate may be higher than the refresh rate of the 2D barcodes. This means that in the captured video frames (i.e., in captured images), not all video frames may contain a unique 2D barcode, as some consecutive video frames may rather contain the same 2D barcode. To be able to identify the unique 2D barcodes, the receiver device may compare the 2D barcodes in subsequent images and identify consecutively captured 2D barcodes as the same if their difference is below a threshold, and/or identify consecutively captured 2D barcodes as unique or different if their difference lies above a threshold. In a specific example, consecutively captured 2D barcodes may be considered different from each other if their (absolute) difference averaged across all pixels of the 2D barcode exceeds a certain threshold in accordance with:

$$Avg_{i,j}(Abs(I(i,j,k+1)-I(i,j,k))>T,$$

where T is a certain threshold (e.g., 0.1 in case of a 10% difference).

In some embodiment, the receiver device may be recording at a much higher refresh rate than the 2D barcode is refreshed, e.g., at a factor 3 or more times higher. The receiver device may then obtain several captured images of a same 2D barcode and select the best captured image from which to decode the data. This 'best' captured image may for example be an image which is in the middle of the captured images pertaining to the same 2D barcode, or at least relatively far away from a transition to another 2D barcode.

Figure 4:
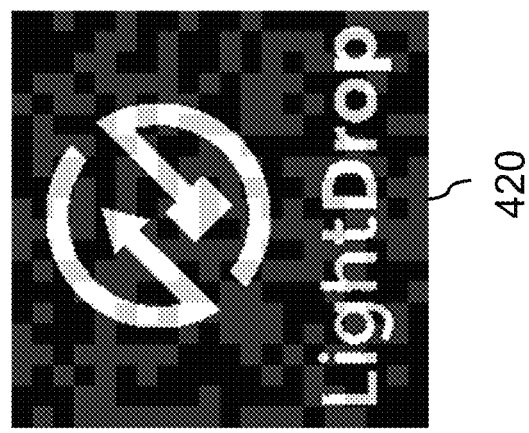
FIG. 4 illustrates the masking of data to be transmitted by a video frame.

In some embodiments, the spatiotemporal mask may be pseudorandom sequence (P(i,j,k)) which may be generated and stored in a file. This file may be accessible to both the sender device and the receiver device. In other embodiments, the pseudorandom sequence may be algorithmically generated using a seed. The sender device and receiver device may use the same seed and the same algorithm to generate the random sequence. In other embodiments, a non-random sequence of data may be used as spatiotemporal mask. For example, as also illustrated in FIG. 4, an existing video may be used as mask. Here, data 400 to be transmitted may be encoded by respective video frames 410 to yield the masked data 420. In this respect, it is noted that for sake of illustration, FIG. 4 only shows a single video frame 410. In some embodiments, the spatiotemporal mask may be derived from a video, for example by downscaling and other processing steps. In some embodiments, the derived spatiotemporal mask may still be considered a video, e.g., a low-resolution video, while in other embodiments, the derived spatiotemporal mask may not resemble a video anymore. In preferred embodiments, a video may be selected as mask or for mask generation which has a sufficiently high degree of spatial and temporal variation.

In some embodiments, temporal variation in a mask pattern may at least in part be obtained by the mask pattern being changed in a predetermined manner between consecutive barcodes. For example, a spatial mask pattern may be inverted between consecutive barcodes, or in any other way changed to obtain temporal variation. At the receiver device, the barcodes may then be decoded on the basis of the spatial mask pattern and data which indicates how the spatial mask pattern will change between barcodes.

Figure 5:
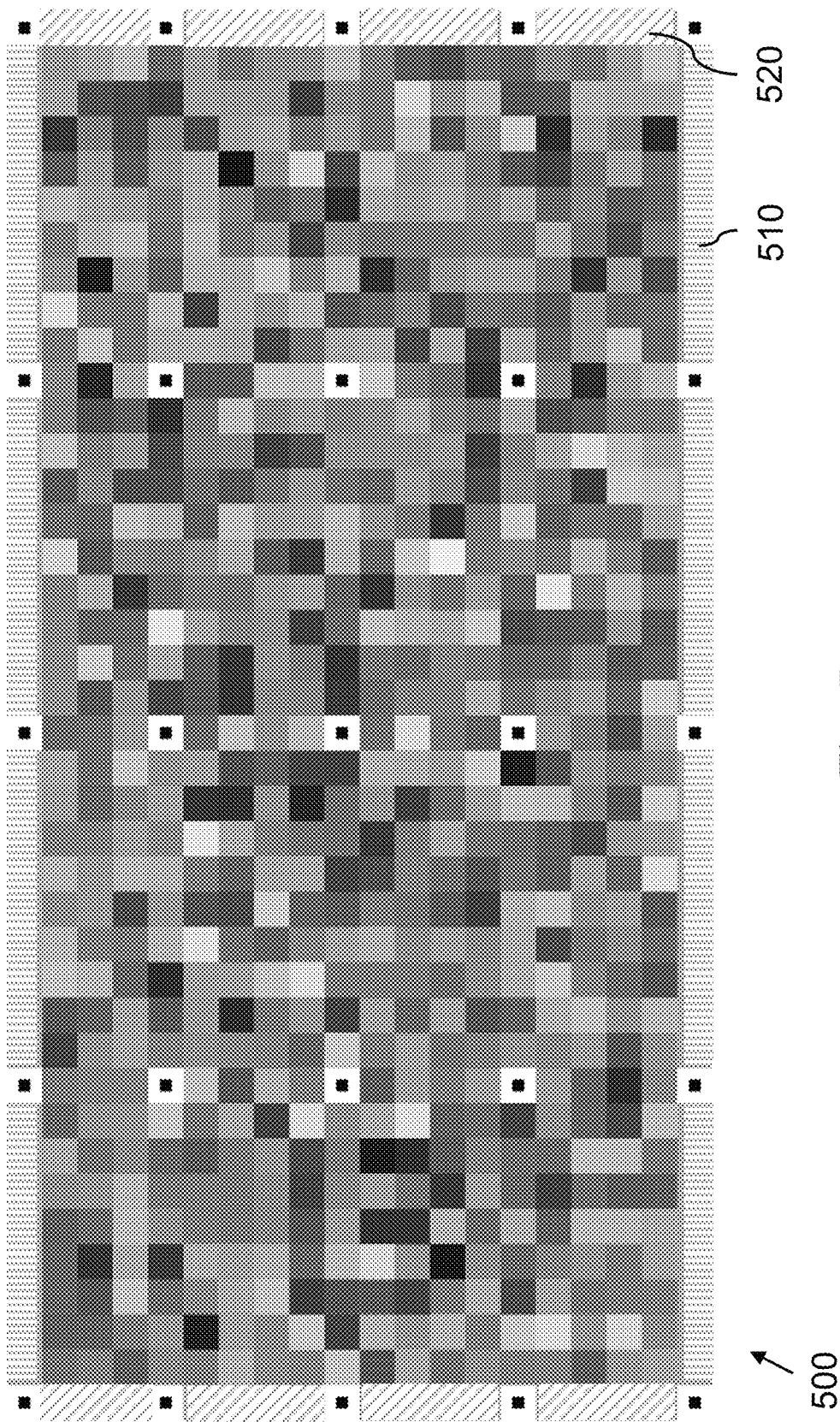
FIG. 5 shows an example of a 2D barcode with spatial markers.

FIG. 5 shows an example of a 2D barcode 500 as may be generated by the sender device. While FIGS. 2 and 4 only show the masked data as encoding 1 bit per element (i.e., per 'block' of the 2D barcode), the data to be transmitted may also be encoded in a way which uses more than 1 bit per element. For example, if an RGB display is used, 8 different intensity levels may be used per color channel, resulting in $8^3=512$ grey levels, which equals $2^9$ bits. FIG. 5 shows a grayscale representation of such an encoding.

FIG. 5 further illustrates that the sender device may display one or more spatial markers in spatial relation to the barcode data of respective 2D barcodes to facilitate detection of the 2D barcodes in the series of captured images. Such spatial markers may for example be or may be comprised of line segments 510, 520 delineating at least part of the 2D barcode. In some embodiments, to facilitate detection of the 2D barcode, a line segment may have a primary color (e.g., red, green, or blue) or a secondary color (e.g., cyan, magenta, or yellow). Different line segments may also have different colors. For example, as also illustrated in FIG. 5, horizontal line segments 510 may have one color, being for example a primary or secondary color, while vertical line segments 520 may have another color, being for example another primary or secondary color. In another example, different colors may be used for the line segments at the left, right, top and bottom of the 2D barcode. Yet another example is that a 2D barcode may be provided with a 2D array of spatial markers, in which the color of the individual spatial markers is chosen such that the array of spatial markers shows a symbol, such as a cross in a 3×3 array of spatial markers:

| Cyan | Yellow | Cyan |
|---|---|---|
| Yellow | Yellow | Yellow |
| Cyan | Yellow | Cyan | or a triangle in a 5×3 array of spatial markers:

| Cyan | Cyan | Magenta | Cyan | Cyan |
|---|---|---|---|---|
| Cyan | Magenta | Magenta | Magenta | Cyan |
| Magenta | Magenta | Magenta | Magenta | Magenta |

In general, the colors of line segments may preferably not occur in the data part of the 2D barcode, and if different colors are used for different line segments, or in general for different spatial markers, the different colors are preferably distinct from each other in at least one color-space. This may allow different spatial markers to be easily identified, for example by applying a thresholding technique to the captured image in the particular color space. In general, line segments may be identified by identifying pixels belonging to the line segments and by fitting a line through these pixels. The crossing between top/bottom and left/right lines may determine the corners of the data part of the 2D barcode. Thereby, the boundaries of the data part of the 2D barcode may be identified. It is noted that the spatial markers may also have any other suitable form. For example, additional features may be added in the four lines (left, right, top, bottom) to further enhance the position detection. For example, squares may be added between line segments.

Figure 6:
FIG. 6 shows a spatiotemporal marker which can be identified by subtracting two consecutive captured video frames of a captured video of a 2D barcode.

FIG. 6 shows an example of a spatiotemporal marker which varies in appearance over time. Such spatiotemporal markers may be used in addition to, or as an alternative for, purely spatial markers, but like the purely spatial markers, may be used to facilitate detection of the 2D barcode. In the example of FIG. 6, the spatiotemporal marker may at first glance not be distinguishable from the barcode data itself, but may vary in appearance faster than that the data in the 2D barcode is refreshed. Namely, the captured image data 600 in capture frame n may be identical to the captured image data 610 in capture frame n+1, except for the spatiotemporal marker. While the spatiotemporal marker may be difficult to identify from either captured image data 600, 610, the difference 620 between both frames clearly shows the presence of the spatiotemporal marker. In other words, this type of spatiotemporal marker may be identified by subtracting two consecutive captured video frames, e.g., frames n and n+1, of a captured video of a 2D barcode.

In general, the appearance of a spatiotemporal marker may vary between sequentially displayed 2D barcodes, for example at a same frequency as the frequency with which the data in the 2D barcode is refreshed, or at a higher frequency. In other words, the spatiotemporal marker may vary in appearance between the sequentially displayed 2D barcodes at a temporal frequency which is different from the temporal frequency at which the barcode data in the respective 2D barcodes is refreshed. In a specific example, the barcode data may be refreshed at 5 Hz, while the spatiotemporal marker(s) may vary in appearance at 10 Hz. In some embodiments, the spatiotemporal marker(s) vary at a frequency that is slightly higher (e.g., 1.1×), somewhat higher (e.g., 2×), much higher (e.g., 10×), etc. than the refresh rate of the barcode data. In other embodiments, the spatiotemporal marker(s) vary at a frequency that is slightly lower (e.g., 1.1×), somewhat lower (e.g., 2×), much lower (e.g., etc. than the refresh rate of the barcode data. In some embodiment, the spatiotemporal marker(s) vary according to a specific temporal pattern. For example, the intensity of a spatiotemporal marker may vary over time as a sinusoid or as a sawtooth from one intensity state to another and back. In some embodiments, the spatiotemporal marker(s) may be inverted in appearance between consecutive capture frames, or may have any other greatly varying appearance, e.g., a large difference in hue, saturation and/or brightness.

In some embodiments, the refresh rate of the spatiotemporal marker(s), and the capture frequency of the receiver device, may be high enough so that camera motion is limited between consecutive frames. This allows the spatiotemporal marker(s) to be found by simple subtraction of consecutive frames as the spatiotemporal marker(s) may remain at substantially the same spatial position within the captured image data. In some embodiments, the capture frequency of the receiver device may be higher than the frequency at which the barcode data in the 2D barcodes is refreshed, for example at least twice as high. In some embodiments, the capture frequency may be equal to or higher than the frequency at which the spatiotemporal marker(s) in the 2D barcode varies appearance.

Although not shown specifically in the figures, the sender device may be configured to display a video within a spatial subregion of the sequence of 2D barcodes. In other words, a video may be played within a video barcode. In some embodiments, two or more videos may be displayed within respective spatial subregions of a video barcode. In some embodiments, the spatial subregion(s) and thereby the video (s) moves within the spatial outline of the video barcode, for example in accordance with a predetermined path.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. Each functional unit of a respective entity may be implemented in the form of a circuit or circuitry. A respective entity may also be implemented in a distributed manner, e.g., involving different devices or apparatus.

Figure 7:
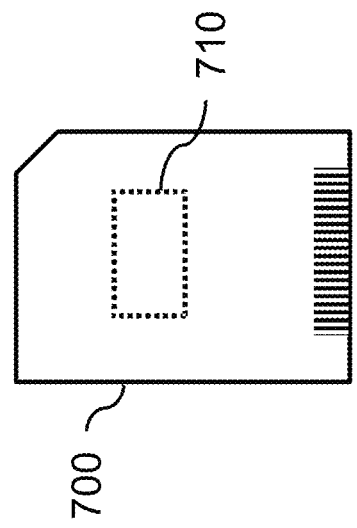
FIG. 7 shows a computer-readable medium comprising data.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 700 as for example shown in FIG. 7, e.g., in the form of a series 710 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, etc. FIG. 7 shows by way of example a memory device 700.

Examples, embodiments or optional features, whether indicated as non-limiting or not, are not to be understood as limiting the invention as claimed.

Mathematical symbols and notations are provided for facilitating the interpretation of the invention and shall not be construed as limiting the claims.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for unidirectional transfer of data from a sender device to a receiver device, wherein the sender device comprises or is connected to a display and the receiver device comprises or is connected to an image sensor, comprising:
 (i) at the sender device:
  accessing data to be transmitted to the receiver device;
  encoding respective parts of the data to generate respective 2D barcodes; and
  (iii) sequentially displaying the 2D barcodes on the display; and
 (ii) at the receiver device:
  using the image sensor, capturing the sequentially displayed 2D barcodes to obtain a series of captured images, and in each or a subset of the series of captured images:
   detecting a position of a respective 2D barcode in the captured image;
   scanning the 2D barcode at the identified position to obtain barcode data; and
   decoding the barcode data to, together with the barcode data obtained from other captured images, obtain a received version of the transmitted data, wherein
  the method further comprising, at the sender device, generating a respective 2D barcode using a mask pattern, and at the receiver device, decoding respective barcode data based on the mask pattern, wherein the mask pattern is a spatiotemporal mask pattern which is different for consecutive pairs of the sequentially displayed 2D barcodes.

2. The method according to claim 1, wherein the spatiotemporal mask pattern is a video or is obtained from a video, wherein the video is accessible to the sender device and the receiver device.

3. The method according to claim 1, wherein the spatiotemporal mask pattern is generated algorithmically as a pseudo-random pattern using a seed, wherein the seed is accessible to the sender device and the receiver device.

4. The method according to claim 1, further comprising, at the sender device, displaying spatial markers in spatial relation to the barcode data of respective 2D barcodes to facilitate detection of the 2D barcodes in the series of captured images, wherein an appearance of at least one of the spatial markers varies between the sequentially displayed 2D barcodes.

5. The method according to claim 4, wherein the at least one spatial marker varies in appearance between the sequentially displayed 2D barcodes at a temporal frequency which is different from the temporal frequency at which the barcode data in the respective 2D barcodes is refreshed, for example higher.

6. The method according to claim 4, wherein the at least one spatial marker comprises a line segment delineating at least part of the 2D barcode, wherein the line segment preferably has a primary color or a secondary color.

7. The method according to claim 1, further comprising, at the sender device, sequentially displaying the 2D barcodes to cause the barcode data in the 2D barcodes to be refreshed at a first temporal frequency, and at the receiver device, capturing images at a second temporal frequency, wherein the second temporal frequency is higher than the first temporal frequency, for example at least twice as high.

8. The method according to claim 7, further comprising, at the receiver device, identifying which captured images contain unique 2D barcodes by determining differences between consecutive pairs of captured images.

9. The method according to claim 8, further comprising, at the receiver device, if two or more consecutive captured images are identified to show a same 2D barcode, selecting one of the two or more captured images for extraction of the barcode data, for example a middle image in case of three or more captured images.

10. The method according to claim 1, further comprising, at the sender device, displaying a video within a spatial subregion of the 2D barcodes.

11. A non-transitory computer-readable medium, wherein the computer-readable medium comprises data representing instructions arranged to cause a processor subsystem of a sender device to unidirectionally transfer data from the sender device to a receiver device by:
 accessing the data to be transmitted to the receiver device;
 encoding respective parts of the data to generate respective 2D barcodes; and
 sequentially displaying the 2D barcodes on a display of the sender device; wherein
 the instructions are further arranged to cause the processor subsystem to generate a respective 2D barcode using a mask pattern, wherein the mask pattern is a spatiotemporal mask pattern which is different for consecutive pairs of the sequentially displayed 2D barcodes.

12. A sender device configured for unidirectional transfer of data to a receiver device, comprising:
 a data storage interface to a data storage;
 a display output to a display (142); and
 a processor subsystem configured to:
  via the data storage interface, access the data to be transmitted to the receiver device;
  encode respective parts of the data to generate respective 2D barcodes;
  via the display output, sequentially display the 2D barcodes on the display, wherein
 the processor subsystem is further configured to generate a respective 2D barcode using a mask pattern, wherein the mask pattern is a spatiotemporal mask pattern which is different for consecutive pairs of the sequentially displayed 2D barcodes.

13. A receiver device configured for receiving data from a sender device, wherein the sender device is configured to transmit the data by sequentially displaying 2D barcodes on a display, comprising:
 a sensor interface to an image sensor;
 a processor subsystem configured to:
  using the image sensor, capture the sequentially displayed 2D barcodes to obtain a series of captured images, and in each or a subset of the series of captured images:
   detect a position of a respective 2D barcode in the captured image;
   scan the 2D barcode at the identified position to obtain barcode data; and decode the barcode data to, together with the barcode data obtained from other captured images, obtain a received version of the transmitted data wherein a respective 2D barcode is generated at the sender device using a mask pattern, wherein the mask pattern is a spatiotemporal mask pattern which is different for consecutive pairs of the sequentially displayed 2D barcodes, and wherein the processor subsystem is further configured to decode respective barcode data based on the mask pattern.

14. A non-transitory computer-readable medium, wherein the computer-readable medium comprises data representing instructions arranged to cause a processor subsystem of a receiver device to receive a unidirectional transfer of data from a sender device by:

using an image sensor of the receiver device, capturing a sequentially displayed 2D barcodes displayed on a display of the sender device to obtain a series of captured images, and in each or a subset of the series of captured images:
detecting a position of a respective 2D barcode in the captured image;
scanning the 2D barcode at the identified position to obtain barcode data;
decoding the barcode data to, together with the barcode data obtained from other captured images, obtain a received version of the transmitted data; wherein a respective 2D barcode is generated at the sender device using a mask pattern, wherein the mask pattern is a spatiotemporal mask pattern which is different for consecutive pairs of the sequentially displayed 2D barcodes, and wherein the instructions are further arranged to cause the processor subsystem to decode respective barcode data based on the mask pattern.

* * * * *